Patented Nov. 7, 1933

1,933,757

UNITED STATES PATENT OFFICE 1,933,757

DISINFECTANT

Hans Priewe, Berlin-Charlottenburg, Germany, assignor to the firm Schering-Kahlbaum A. G., Berlin, Germany No Drawing. Application January 28, 1929, Serial No. 335,748, and in Germany February 3, 1928

8 Claims. (Cl. 167—22)

My invention refers to disinfectants and more particularly to products for use in disinfecting rooms, furniture etc. as well as the hands, instruments and the like in surgery.

It has reference to a double compound of urea and m-cresol having the formula

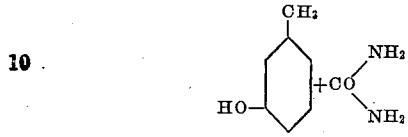

the production of which is described in an application for patent of the United States, Serial No. 315,864, filed on the 12th of September, 1928, by Herbert Schotte and myself jointly.

According to the invention described in the application afore mentioned, if a mixture of m- and p-cresols is treated with urea, for instance by dissolving the urea in the warmed cresol mixture or by grinding this mixture with solid urea at ordinary temperature, the m-cresol-urea addition compound separates out in the form of fine soft crystal scales melting at about 60° C. and containing about 64% m-cresol, the adhering and strewing capacity of these scales being similar to those of talc. This compound, when exposed to air or to the moisture adhering to the human body will slowly absorb water and be decomposed to form a homogeneous, well wetting emulsion of m-cresol in a saturated solution of urea. About 5 parts of the double compound will dissolve completely in water.

I have now found that if this double compound is mixed with pulverulent diluting substances which may be either indifferent, such as talc, kieselguhr or the like, or may themselves have the character of disinfectants, such as for instance boric acid, the mixture, which may also be compressed into tablets or the like, is particularly suited for disinfecting rooms, furniture and other articles and quite especially the hands, rubber gloves, instruments and the like used in ambulant surgery.

In order to obtain mixtures adapted for various uses I may for instance proceed as follows:

*Example 1*

In order to obtain a dry disinfectant I mix 50 parts of the addition compound of m-cresol and urea with 25 parts powdered talc and grind the mixture which then forms a highly efficient disinfectant, which can easily be strewed and is particularly adapted for the purpose of wholesale disinfection.

*Example 2*

A mixture which is perfectly adapted for the disinfecting of the hands or other parts of the body, the rubber gloves etc., used in practical surgery, I mix 50 parts of the double compound with 900 parts talc to which may be added 50 parts crystallized boric acid.

*Example 3*

In order to prepare a disinfecting solution, I mix 50 parts of the double compound with 10 parts of the sodium salt of naphthalene sulfonic acid or a homologue thereof, the mixture being ground and compressed into tablets, which are readily soluble in water.

*Example 4*

50 parts of the double compound are kneaded with 5 parts Turkey red oil and 5 parts sodium benzoate and the plastic mass resulting in this treatment is compressed into tablets which harden on being dried and crumble readily in water to form a limpid solution of m-cresol.

*Example 5*

50 parts of the double compound are mixed with 10 parts resin soap and the mixture is converted into tablets by pressure.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. A disinfectant consisting of a mixture of the double compound of urea and m-cresol containing 1 mol urea and 1 mol m-cresol with a diluent.

2. A disinfectant consisting of a mixture of the double compound of urea and m-cresol containing 1 mol urea and 1 mol m-cresol with a diluent having the character of a disinfectant.

3. A disinfectant consisting of a mixture of the addition compound of urea and m-cresol containing 1 mol urea and 1 mol m-cresol with naphthalene sulfonic sodium.

4. A disinfectant consisting of a mixture of the addition compound of urea and m-cresol containing 1 mol urea and 1 mol m-cresol with Turkey red oil and sodium benzoate.

5. A disinfectant consisting of a mixture of the addition compound of urea and m-cresol containing 1 mol urea and 1 mol m-cresol with resin soap.

6. A disinfectant consisting of a mixture of 50 parts by weight of the addition compound of urea and m-cresol containing 1 mol urea and 1 mol m-cresol with 10 parts naphthalene sulfonic sodium.

7. A disinfectant consisting of a mixture of 50 parts by weight of the addition compound of urea and m-cresol containing 1 mol urea and 1 mol m-cresol with 5 parts Turkey red oil and 5 parts sodium benzoate.

8. A disinfectant consisting of a mixture of 50 parts by weight of the addition compound of urea and m-cresol containing 1 mol urea and 1 mol m-cresol with ten parts resin soap.

HANS PRIEWE.